United States Patent [19]

Eriksson et al.

[11] Patent Number: 4,965,934

[45] Date of Patent: Oct. 30, 1990

[54] LAMINATED GUIDEBAR

[75] Inventors: Lars-Olov Eriksson, Edsbyn; Erik Sundström, Sandviken, both of Sweden

[73] Assignee: Sandvik AB, Sandviken, Sweden

[21] Appl. No.: 442,703

[22] Filed: Nov. 29, 1989

[51] Int. Cl.[5] ................ B23D 57/02

[52] U.S. Cl. ................ 30/387; 30/383

[58] Field of Search ................ 30/383–387

[56] References Cited

U.S. PATENT DOCUMENTS 4,641,432 2/1987 Kume ................ 30/387 X

FOREIGN PATENT DOCUMENTS 636506 1/1963 Canada ................ 30/387

*Primary Examiner*—Douglas D. Watts

*Attorney, Agent, or Firm*—Burns, Doane, Swecker & Mathis

[57] ABSTRACT

A guidebar for powered saws comprises three plates joined by spot welding, where the outer plates are made from a hardenable steel with carbon content over 0.5 percent without boron and the middle plate from a boron alloyed steel with a carbon content lower than 0.25 percent, thus simultaneously achieving high wear resistance at the chain groove, high strength at the spot welds and high resistance to bending.

4 Claims, 1 Drawing Sheet

LAMINATED GUIDEBAR

BACKGROUND OF THE INVENTION

The invention relates to guidebars for power saws and, in particular, to materials of which such guidebars are constructed.

In power-driven chainsaws, guidebars are used to guide the sawchain laterally and to transmit to the sawchain the feed force needed for the saw teeth to penetrate material being sawed. Guidebars of corresponding design are also used for power-driven saws having one or more reciprocating saw blades.

The drive links of the sawchain or the narrow back of the reciprocating saw blades extend into a groove made in the edge of the guidebar and are laterally guided by the sides of the groove. The edges of the guidebar bordering the groove form smooth rails against which the sawchain or saw blade slides, and which transmit the feed force. The bottom of the groove does not touch the sawchain or saw blade, but serves to transport lubricating oil from oil holes placed near the attachment end of the guidebar.

The guidebar can be made from a thick plate, where the groove at the edge has been made by milling. It is also known that the guidebar can be made as a laminated construction from three thinner plates joined by spot welding. A laminated guidebar presents several technical advantages, including lower vibrations and noise, easier mounting of a nose sprocket and the ability to arrange channels in the middle plate to convey lubricating oil to the nose sprocket. Examples of such laminated guidebars are described in Swedish Patent No. 301,546 and U.S. Pat. No. 3,279,508 (for sawchains) and European Patent No. 212 816 (for saw blades).

In order to reduce wear of the rails at the edge of the guidebar, oil is always supplied, and attempts are made to give the sliding surfaces of the rails great hardness through hardening. This ability is limited, however, since those steel types which are most suitable for hardening cannot be welded with satisfactorily, but rather result in brittle welded joints having numerous micro cracks.

In order to allow use of hardenable alloy steel types for at least the outer plates which form the sliding rails, it has been suggested to join the plates with rubber or glue as in Canadian Patent No. 649,018 or by brazing as in U.S. Pat. Nos. 3,119,418 and 3,545,505, but none of those methods has been shown to give sufficient strength at reasonable cost.

The problem of joining dissimilar materials has been discussed in U.S. Pat. 3,191,646, which in this case recommends riveting, and German Patent No. 35 18 990 which suggests spot welding through small inserts located in holes in the middle plate.

SUMMARY OF THE INVENTION

The invention concerns a guidebar where both outer plates are made from a hardenable alloy steel and joined by spot welding to a middle plate of another steel type, the composition of which allows spot welding to the hardenable steel without risk of brittleness.

BRIEF DESCRIPTION OF THE DRAWING

The objects and advantages of the invention will become apparent from the following detailed description of a preferred embodiment thereof in connection with the accompanying drawings in which like numerals designate like elements, and in which.

DETAILED DESCRIPTION OF A PREFERRED EMBODIMENT OF THE INVENTION

Figure 1:
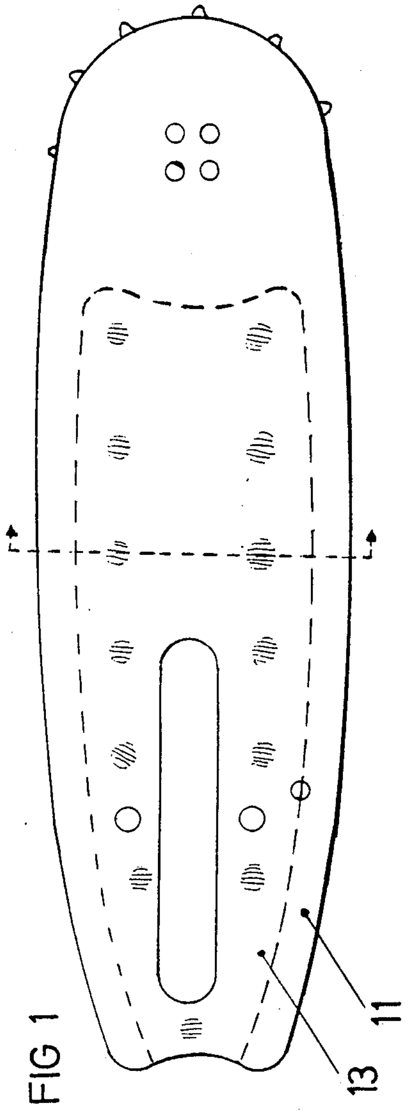
FIG. 1 is a side elevational view of a guidebar according to the invention.
Figure 2:
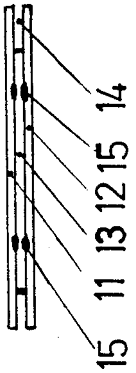
FIG. 2 is a cross-sectional view of the guidebar taken through two weld spots.

The guidebar comprises two outer plates 11, 12, and one middle plate 13, all joined together by spot welding which penetrates all three plates simultaneously. The plates form a groove 14 at least along one edge. The outer plates 11, 12 are made from a hardenable steel with more than 0.5% carbon, preferentially in addition to contents of chromium, molybdenum and vanadium together totalling not over 4.5%, the remainder iron and normally occurring contaminants, not including boron. After hardening and grinding, the sliding rails of the outer plates have a Vickers hardness of about 700.

If two plates of such hardenable material were joined directly by spot welding, a small amount of each plate would become melted and mixed, whereby the molten material would solidify rapidly and form a brittle martensitic-pearlitic weld which might easily be cracked. If the guidebar were thereafter annealed at a high temperature above 520° C. such that the brittleness at the weld is removed, the strength of the base material of the plates would also decrease and there would be a risk of deformations occurring as the built-in stresses from hardening are relaxed.

One way of avoiding the creation of brittleness is to choose for the middle plate 13 a material with low carbon content, i.e., below 0.12%. When the molten material from the middle plate 13 is mixed with that of an outer plate 11, 12 during welding, the melt will have a carbon content between 0.3% and 0.4%, which will solidify without formation of brittle martensite. Carbon steel with such a specially low carbon content has, however, a low strength in its base material, especially after annealing and close to the weld, and is thus less suitable in guidebars subjected to severe stress and vibrations.

According to the present invention, the middle plate 13 is made from a boron alloyed steel which has a carbon content below 0.25% and has been given a limited hardenability by a small boron content, preferably in the range of 0.002% to 0.004%. That type of steel can be spot welded to hardenable steel with high carbon content, whereby the melt 15 of the weld solidifies without brittleness through formation of a tough martensite without pearlitic regions The strength will then be sufficient, also after annealing and close to the weld. All three plates may be hardened before welding, either as separate pieces or as a strip before blanking.

After the three plates are welded together, they are annealed to decrease the risk of cracking at the welds, and if the middle plate 13 is made from boron alloyed steel this annealing can be performed at a much lower temperature, e.g., at 490° to 500° C., than if it had been made from steel without boron. Thus, the outer plates 11, 12 retain more of their hardness, which eliminates the deformations and loss of precision occurring with annealing at higher temperature.

By annealing to the above-mentioned lower temperature, which corresponds to the tempering temperature of the outer plates after hardening, the steel will not have a distinct yield stress, which means that overloading the guidebar results in a distributed and largely recoverable deformation, whereas a guidebar annealed at higher temperature and subjected to the same overload would suffer a sharply localized permanent bending with the risk of immediate failure as a consequence.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. A guidebar for powered saws, comprising two outer plates and a middle plate all joined together by spot welds, and forming a groove along an edge thereof for guiding a cutting element, said outer plates formed of a hardenable steel having a carbon content greater than 0.5 percent without boron, said middle plate formed of a boron alloyed steel having a carbon content less than 0.25 percent.

2. A guidebar according to claim 1, wherein said middle plate is formed of a boron alloyed steel having a boron content in the range of 0.002 to 0.004 percent.

3. A guidebar according to claim 1, wherein said outer plates contain Cr, Mo, and V in amounts totaling no more than 4.5 percent, the rest comprising iron and normally occurring impurities.

4. A guidebar according to claim 1, wherein said middle plate comprises a plate hardened prior to spot welding.

* * * * *